United States Patent
Hufschmied

(10) Patent No.: US 9,849,522 B2
(45) Date of Patent: Dec. 26, 2017

(54) END MILLING CUTTER FOR PROCESSING OF FIBER-REINFORCED MATERIALS SUCH AS CAROBON FIBER REINFORCED PLASTICS (CFRP)

(71) Applicant: Hufschmied Zerspanungssysteme Gmbh, Bobingen (DE)

(72) Inventor: Ralf Hufschmied, Bobingen (DE)

(73) Assignee: Hufschmied Zerspanungssysteme GmbH, Bobingen (DE)

( * ) Notice: Subject to any disclaimer, the term of this patent is extended or adjusted under 35 U.S.C. 154(b) by 163 days.

(21) Appl. No.: 14/431,946

(22) PCT Filed: Sep. 27, 2013

(86) PCT No.: PCT/EP2013/002912
§ 371 (c)(1),
(2) Date: Mar. 27, 2015

(87) PCT Pub. No.: WO2014/056582
PCT Pub. Date: Apr. 17, 2014

(65) Prior Publication Data
US 2015/0251253 A1    Sep. 10, 2015

(30) Foreign Application Priority Data

Oct. 10, 2012 (DE) .................. 10 2012 019 804

(51) Int. Cl.
*B23B 51/08* (2006.01)
*B23C 5/10* (2006.01)

(52) U.S. Cl.
CPC ............... *B23C 5/10* (2013.01); *B23B 51/08* (2013.01); *B23B 2226/275* (2013.01);
(Continued)

(58) Field of Classification Search
CPC ............ Y10T 407/1815; Y10T 407/82; B23C 2210/086; B23C 2210/088; B23C 2210/326; B23C 2210/321; B23C 2226/27

See application file for complete search history.

(56) References Cited

U.S. PATENT DOCUMENTS 3,058,199 A   10/1962  Alexander
3,947,143 A   3/1976   Gulla
(Continued)

FOREIGN PATENT DOCUMENTS

AU    37947/89       1/1990
CA    2741681 A1     6/2010
(Continued)

OTHER PUBLICATIONS

Translation of International Preliminary Report on Patentability for PCT/EP2013/002912, dated Apr. 20, 2015, 11 pages.

*Primary Examiner* — Sunil K Singh
*Assistant Examiner* — Donte Brown
(74) *Attorney, Agent, or Firm* — Varnum, Riddering, Schmidt and Howlett LLP

(57) ABSTRACT

The invention concerns a machining tool for machining fiber-reinforced materials such as CFRP, glass-fiber-reinforced plastics or plastics reinforced with polyester threads. The machining tool comprises a plurality of flutes (1, 2, 3, 4) which distance lands (5, 6, 7, 8), disposed about a cylinder core segment (9), from each other in the peripheral sense. At least one of the lands (6, 8) is designed as a premachining land (6, 8) and at least one other of the lands (5, 7) is designed as a postmachining land (5, 7), each comprising a peripheral working region extending along, or with a twist and in the form of a helical segment about, the tool axis. The working region of each premachining land (6, 8) is designed as a peripheral file with a plurality of teeth (10) which are
(Continued)

incorporated in a cylinder surface segment-shaped outer surface of the working region, and provided in the working region of each postmachining land (5, 7) is a number of sharp cutting edges (11, 12, 13, 15) extending parallel to or with a twist and in the form of a helical segment about the tool axis. The invention is characterized in that the number of sharp cutting edges (11, 12, 13, 15) on at least one postmachining land (5, 7) comprises a plurality of cutting edges (11, 12) each provided on a peripheral casing groove, the casing grooves being incorporated in a cylinder surface segment-shaped outer face of the working region, parallel to each other and at a pitch relative to the flute (1, 3) leading at least one postmachining land (5, 7).

10 Claims, 3 Drawing Sheets

(52) U.S. Cl.
CPC .. *B23C 2210/321* (2013.01); *B23C 2210/326* (2013.01); *B23C 2210/40* (2013.01); *B23C 2220/605* (2013.01); *B23C 2226/27* (2013.01); *Y10T 407/1815* (2015.01)

(56) References Cited

U.S. PATENT DOCUMENTS

| | | | |
|---|---|---|---|
| 4,475,850 A | 10/1984 | Penoza et al. | |
| 4,480,949 A | 11/1984 | Van De Bogart | |
| 4,990,035 A | 2/1991 | Scheusch | |
| D328,557 S * | 8/1992 | Nishimura | D8/70 |
| 5,193,944 A * | 3/1993 | Nishimura | B23C 5/1081 407/119 |
| 5,221,163 A | 6/1993 | Nishimura | |
| 6,164,876 A | 12/2000 | Cordovano | |
| 9,327,353 B2 * | 5/2016 | Shpigelman | B23C 5/10 |
| 2002/0090273 A1 * | 7/2002 | Serwa | B23C 5/10 409/132 |
| 2003/0180104 A1 | 9/2003 | Kuroda | |
| 2010/0196114 A1 | 8/2010 | Sugano | |

FOREIGN PATENT DOCUMENTS

| | | | | |
|---|---|---|---|---|
| CN | 201871785 U | * | 6/2011 | B23C 5/10 |
| CN | 201960185 U | * | 9/2011 | B23C 5/10 |
| CN | 102266974 A | * | 12/2011 | B23C 5/02 |
| CN | 202192310 U | * | 4/2012 | B23C 5/02 |
| CN | 104551169 A | * | 4/2015 | B23C 5/10 |
| CN | 104551170 A | * | 4/2015 | B23C 5/10 |
| DE | 86 09 688.5 | | 10/1986 | |
| DE | 37 42 942 | | 12/1988 | |
| DE | 3742942 C1 | | 12/1988 | |
| DE | 202 09 768 | | 1/2004 | |
| DE | 202 11 589 | | 3/2004 | |
| DE | 202 11 592 | | 5/2004 | |
| DE | 203 04 580 | | 8/2004 | |
| DE | 102006022572 A1 | * | 11/2007 | B23C 5/02 |
| DE | 102 32 037 | | 11/2008 | |
| DE | 11 2009 000013 | | 9/2010 | |
| DE | 10 2010 051377 | | 5/2012 | |
| DE | 202015106056 U1 | * | 11/2015 | B23C 5/10 |
| DE | 202016003608 U1 | * | 6/2016 | B23C 5/10 |
| JP | 60-99518 | | 6/1985 | |
| JP | 02198708 A | * | 8/1990 | B23C 5/16 |
| JP | 2006102870 | | 4/2006 | |
| JP | WO 2010061933 A1 | * | 6/2010 | B23C 5/10 |
| KR | WO 2010021487 A1 | * | 2/2010 | B23C 5/12 |

\* cited by examiner

END MILLING CUTTER FOR PROCESSING OF FIBER-REINFORCED MATERIALS SUCH AS CAROBON FIBER REINFORCED PLASTICS (CFRP)

CROSS-REFERENCE TO RELATED APPLICATIONS

This application is the U.S. national stage of PCT/EP2013/002912 filed Sep. 27, 2013, which claims priority of German Patent Application 10 2012 019 804.3 filed Oct. 10, 2012.

TECHNICAL FIELD

The invention relates to an end milling cutter for machining fiber reinforced materials such as CFRP, according to the preamble of claim 1.

BACKGROUND DISCUSSION

When milling and drilling of fiber-reinforced materials such as CFRP, GFRP and polyester filament-reinforced plastics, the problem that occurs often is a tearing of individual fibers or polyester yarns are fanning out, when a workpiece of such a material is machined with conventional tools for machining. Thus, individual fibers are torn from the edge of the machined area and others are pressed during passage of the tool to the edge of the machined area, so that they are cut only on an end protruding over the edge of the machined area and therefore protrude over the rim after machining. Usually, therefore, a post machining, ie a finishing or reaming is performed after a rough machining or roughing.

Starting from finishing-roughing-cutters known in metalworking, such as described in German patent DE 3742942 C1 or German utility model DE 8609688 U1 or U.S. Pat. No. 4,285,618 B, wherein each roughing cutting edge is associated with a trailing finishing cutting edge, also in the machining of fiber-reinforced materials and of sandwich materials with such materials efforts have been made with the aim of being able to accomplish both a rough machining, ie a roughing workstep, as well as a postmachining, ie a postreaming or finishing workstep with a single tool, in order to arrive at an improved surface quality with less processing time.

For example, German utility model DE 202 09 768 U shows a step drill for machining sandwich materials, wherein the main cutting edges at the step are offset to one another so that the one main cutting edge premachines and the other postreams. German utility model DE 202 11 589 U1 shows another drill for machining sandwich workpieces, wherein two premachining lands are more or less blunt designed as broaching tools and the postmachining lands trailing in the circumferential direction with sharp minor cutting edges as reamers. Similar drills are shown in the utility models DE 202 11 592 U and DE 203 04 580 U1, wherein there, broad circular grinding chamfers are used for reinforcement of the drilled hole and rounded cutting corners in order to prevent tearing of the thread.

An end milling cutter for machining of fiber reinforced plastics, wherein the idea of a separation of functions in the main cutting work doing, leading machining lands and only postmachining, trailing lands has also been implemented, is shown in German Patent DE 112 009 000 013 B4. There, the leading lands have a left-hand twist and the trailing lands have a right-hand twist. There, this is to avoid burrs.

Furthermore, milling tools are known from the machining of plastics, which are, similar to files, on the peripheral surfaces of their machining lands, provided with teeth, particularly generated by intersecting grooves with a depth which is relative to the tool diameter relatively small. Such a tool is already shown in German patent DE 736 449, and in German patent DE 10232037 B4 of the applicant.

The use of tools with shell grooves and chip breaker grooves for the processing of fiber-reinforced materials is disclosed in U.S. Pat. No. 5,221,163 and in international application WO 2010/061933 A1.

U.S. Pat. No. 6,164,876 discloses a tool with two lands, one of which has a plurality of teeth and the other a conventional cutting edge.

SUMMARY OF THE INVENTION

Starting from this, the present invention is based on the object of further developing an end milling cutter for machining of fiber-reinforced materials such that with lower processing time an improved surface quality can be achieved.

This object is solved by the features of claim 1.

As with the generic machining tool, according to the invention, a separation of functions into a first machining function and a second machining function is carried out, wherein the different machining functions are performed by means of differently designed lands. For this purpose, at least one of the lands placed around a cylinder core segment and being spaced circumferentially by a plurality of flutes is of a first type and is referred to hereinafter as a premachining land and another is of a second type and is referred to hereinafter as a postmachining land. However, it is difficult to say which machining takes place first or afterwards during the chipping operation of the rotating tool, so that those designations are not intended to be limiting. As with the generic machining tool, which comprises on its machining lands peripheral cutting edges with adjoining circular grind chamfers provided for stiffening, also the lands of the machining tool according to the invention each have a peripheral machining area, which, however, not only can extend twisted with a shape of a helix or spiral segment about the tool axis of the machining tool, but in other embodiments can extend along the tool axis, ie parallel to the tool axis, if the flutes are not coiled.

The inventor has found that with a combination of the peripheral working or machining areas well-known from the plastics processing with a plurality of teeth on the one hand and a plurality of grooves serving as finishing or reaming blades on the other hand, particularly good results can be achieved in the surface quality of workpieces of fiber reinforced materials to be machined.

According to the invention, the machining area of each premachining land is therefore formed as a peripheral file with a plurality of teeth—as it is per se already known from the machining plastics. Ie, the teeth are incorporated or worked into a shell or mantle surface of the machining area, which is shaped as or in the form of a segment of a cylindrical surface. However, differing from the known plastic chipping tool, the postmachining lands have a different function and design: In the machining area of every postmachining land, a number of sharp cutting edges is provided, which extend in the shape of a helix or spiral segment in parallel to or twisted about the tool axis, that is cutting edges on an acute cutting wedge with a positive rake angle, for example, 5°-15°, in particular 8°. Therein, the number of sharp cutting edges on at least one postmachining land comprises a plurality of cutting edges, respectively provided on a peripheral shell groove or mantle groove, wherein the shell grooves extend in parallel to each other and are incorporated into a shell surface of the machining area with a shape of a segment of a cylindrical surface with slope as against a flute leading the at least one postmachining land. Thus, the peripheral machining area on the postmachining land is interspersed with shell grooves shaped in the form of a segment of a helix and extending in parallel side by side in the manner of a screw's thread.

It is assumed that, in principle as in the known finishing-roughing-cutters and drills, this geometry of the tool acts such that on the premachining lands a rough machining or roughing takes place, during which the individual teeth do the essential removal of material, whereas on the postmachining lands a finishing or reaming or rubbing occurs. By using of single teeth for roughing, it seems to come to a crushing of the material, wherein a tearing out of single threads or filaments, however, seems to be largely preventable. That is, by the only punctual material removal during impact of the teeth of the premachining or roughing land, tearing of individual fibers out of the fiber-reinforced material can be largely avoided. During finishing, material remains and especially fiber ends protruding from the pre-processed or premachined wall are then separated.

In combination with the shell grooves on the postmachining land or preferably the postmachining lands, this tool geometry has shown in experiments particularly good surface quality, especially also with materials that are reinforced with polyester yarns, which are prone to fraying or fanning out, which was effectively prevented in experiments. Therein, the shell grooves and thus the finishing cutting edges can extend relatively flat, ie with a relatively small helix angle, for example >30° and therefore do not frontally hit with great force on the thread ends, but from the side, like by a cut with a knife with reduced force but over a longer time or blade length.

In addition to the plurality of finishing cutting edges respectively provided on one of the shell grooves, the number of sharp and therefore finishing cutting edges on one or more other postmachining lands can comprise a conventional cutting edge along the acute cutting wedge between the flute leading the postmachining land and the circumference of the postmachining land, to which in case of this alternative example, a circular grinding chamfer, or a similar peripheral machining area suitable for stiffening could adjoin. It would also be conceivable to provide the shell grooves on one or more of the postmachining lands and to provide on one or more other postmachining lands a conventional finishing cutting edge.

However, it has been found particularly advantageous, if at least one first postmachining land is provided, having a first plurality of cutting edges with a positive slope, each at a shell groove, and at least one second postmachining land is provided, having a second plurality of cutting edges with a negative slope, each at a shell groove. By the rotational speed of the machining tool, which can be a few thousands or ten thousands revolutions per minute, sort of "cut by scissor" is simulated, wherein fiber stumps protruding from the wall can be cut or removed as with scissors.

By the opposite orientation of the shell grooves and thus the cutting edges on the first and second postmachining lands, depending on the material to be machined or depending on the fibers used in the workpiece to be milled or to be drilled for fiber reinforcement, by appropriate choice of the helix angle or slope angle or twist angle with which the shell grooves and hence the cutting edges are inclined as to the tool axis, but are in opposite directions to each other, the described cut by scissor effect and the result can be optimized. However, it has been found that a helix angle of an absolute value of at least 15-20° on both kinds of postmachining lands is advantageous for all known fiber-reinforced materials. The helix angle is the angle which is spanned by the cutting edges and the tool axis in a projection plane.

For example, the spiral angles of the shell grooves or outer grooves on the number of first or the number of second postmachining lands may be steeper and the helix angle on the other number of postmachining lands may be more flat, and it would even be conceivable that the helix angle is negative on the first and on the second postmachining lands is positive or even negative on both, if it is differing enough to simulate a cut by scissor. Advantageously, they are in any case in opposite directions, that is, at the one (eg. first) machining land positive and at the other, (eg. second) machining land negative. For the machining of materials with polyester filaments or yarns, it has proven to be particularly advantageous if the grooves are in opposite directions to each other by about 45°, ie if their projections cross at a certain position on the workpiece with 45°. For fibers made of kevlar, however, a crossing angle of 60° has proved to be useful and for aramid, a crossing angle of 120°, respectively approximated. In order to optimize the corresponding effect of the shell grooves on the first postmachining land and the opposite angled shell grooves or cutting edges on the second postmachining land, it is advantageous if the shell grooves are dimensioned the same on all postmachining lands.

It is also advantageous if an even-numbered plurality of flutes and therewith an even-numbered plurality of lands are provided, such that pre- and postmachining lands can alternate in circumferential direction. A particularly preferred further development has four flutes and lands, thereof two premachining lands with peripheral files and two postmachining lands, one of which is formed as a first postmachining land and one of which as a second postmachining land, wherein, in the circumferential direction between the two postmachining lands, a premachining land is respectively interposed. However, also embodiments of the invention with six, eight or more lands are conceivable, wherein pre- and postmachining lands could alternate in the circumferential direction.

It is also advantageous, if the postmachining lands are provided with both the sharp cutting edge along the edge to the leading flute as well as the sharp cutting edges at the shell grooves, wherein the shell grooves or grooves in the shell might have a different twist or helix angle than the flutes and thus break through the cutting edge along the flute. In this way, the shell grooves additionally act as chip breaker grooves for the cutting edge along the flute.

Furthermore advantageous, on at least one, preferably along each premachining land, a sharp cutting wedge is provided between the flute leading the premachining land and the circumference of the premachining land, so that the premachining land can dig into the material with the cutting wedge and thereby large thicknesses of material per revolution can be crushed or smashed by the roughing teeth.

The teeth advantageously have a polygonal and in particular diamond-shaped base surface and preferably a pyramid shape and are arranged along lines intersecting with positive and negative slope on the lateral or shell surface of the machining area of the respective premachining land. Such pyramids are relatively easy to manufacture or to be incorporated by grinding-in of grooves along the intersecting lines.

A particularly good stiffening during the drive into the solid material is obtained, if the lands are equidistantly distributed over the tool's circumference, that is when the phase angles from the cutting edge of one land to the cutting edge of the next trailing land are identical or at least about the same. In terms of a good stiffening or rigidity and a resulting accuracy in drilling or milling, it has proven to be positive, if the machining area of each premachining land extends over its entire portion of circumference between the respective leading flute and the respective trailing flute and not only in the area of a relatively small circular grinding chamfer or round ground phase, that is, when the or each premachining land has no peripheral clearance surface. The same is true of the postmachining land or the postmachining lands.

The machining tool according to the invention or advantageously further developed was designed as a milling tool and in particular as an end milling cutter and therefore preferably has a tip geometry suitable for driving into solid material. It would be equally conceivable to provide other machining tools such as drills with pre- and postmachining lands according the invention or advantageously further developed.

BRIEF DESCRIPTION OF THE DRAWINGS

Hereinafter, an advantageous embodiment of the invention will be explained in more detail by means of the accompanying drawings.

In the drawings.

DETAILED DESCRIPTION OF EMBODIMENTS

Figure 1:
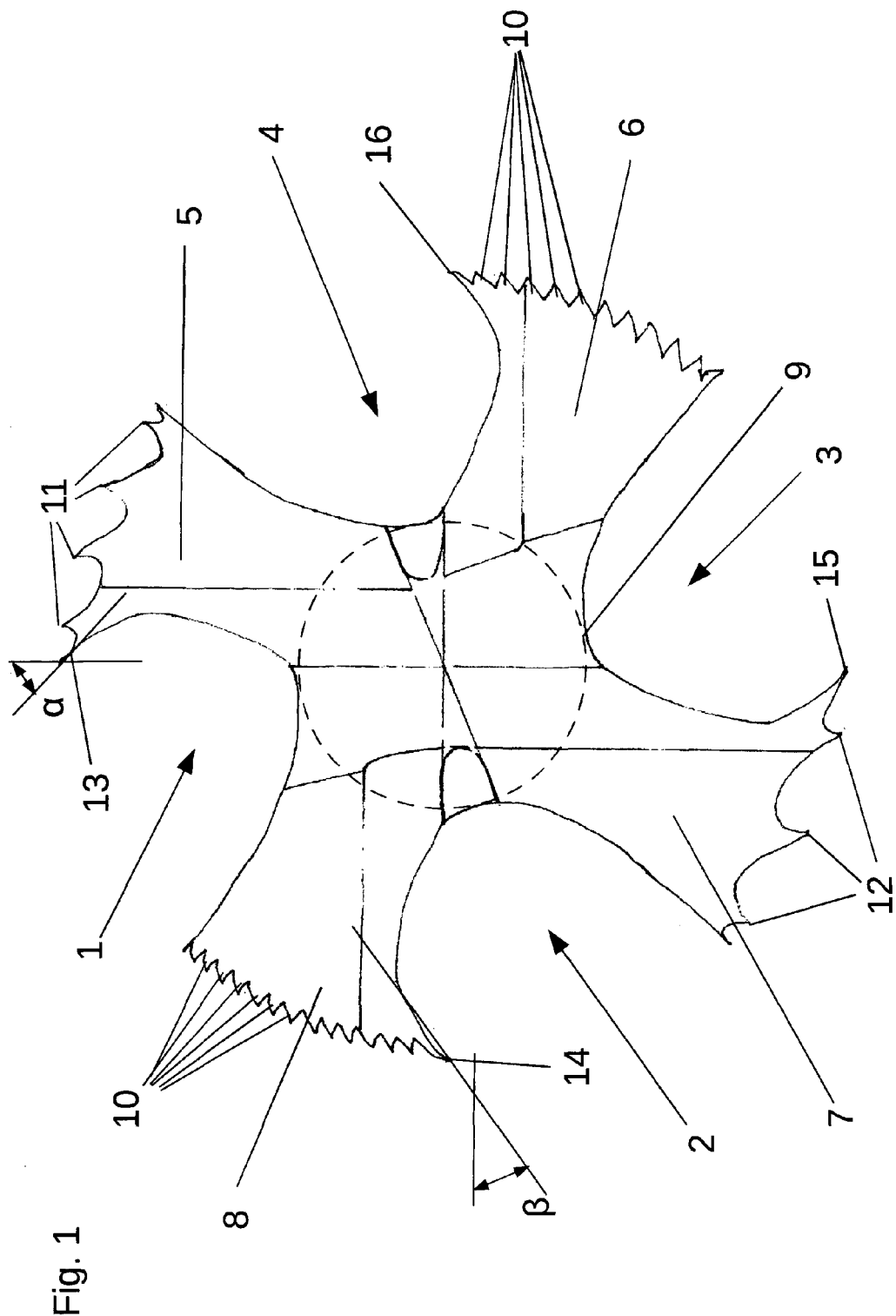
FIG. 1 is a front view of the tool tip of an end milling cutter according to an advantageous embodiment of the invention.

The end milling cutter shown in the figures has four equidistantly spaced flutes 1, 2, 3, 4, which equidistantly space lands 5, 6, 7, 8 from each other, which are placed around a cylinder core segment 9. At the peripheral outer edge of the lands 5, 6, 7, 8 facing the leading flute 1, 2, 3, 4, a cutting edge 13, 14, 15, 16 is respectively provided on an acute cutting wedge, wherein the rake angles α, drawn in the FIG. 1, on the two lands 5, 7, and 13 on the two lands 6, 8 are of equal size, but are shown somewhat exaggerated in the Figure and in reality be about 8°.

On the two opposite lands 6, 8, pyramid-shaped teeth 10 are incorporated in their peripheral machining areas extending from the tool tip along the tool axis, by grinding-in of triangular grooves into the circumferential surface of the lands 6, 8 along intersecting lines on the circumferential surface. The two opposite lands 6, 8 thus serve as pre- or rough machining lands that should smash with their teeth 10 during milling the impacted fiber-reinforced material of the workpiece.

At the two other lands 5, 7 on the other hand, shell grooves being sloped to the tool axis are incorporated or ground into the peripheral shell surface of the lands 5, 7, on which shell grooves' circumferential outer edge trailing the respective shell groove, a sharp edge 11, 12 is formed. The two lands 5, 7 thus serve as postmachining or fine machining or finishing lands and rub off the material left over during roughing by means of the premachining lands 6, 8 from the machined wall of the workpiece, especially fiber ends protruding from the workpiece wall.

Figure 2:
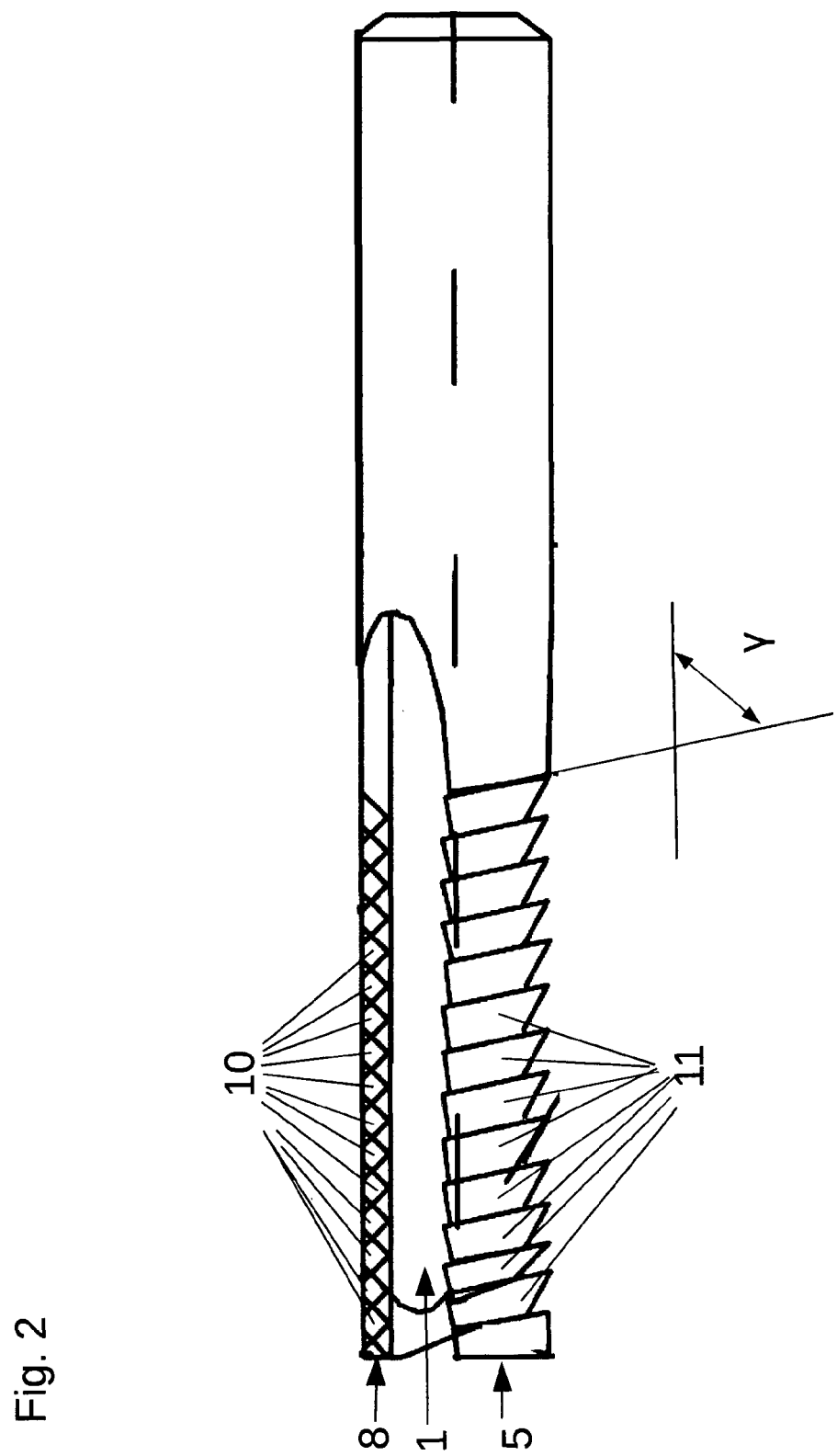
FIG. 2 is a schematic side view of the end milling cutter shown in FIG. 1.
Figure 3:
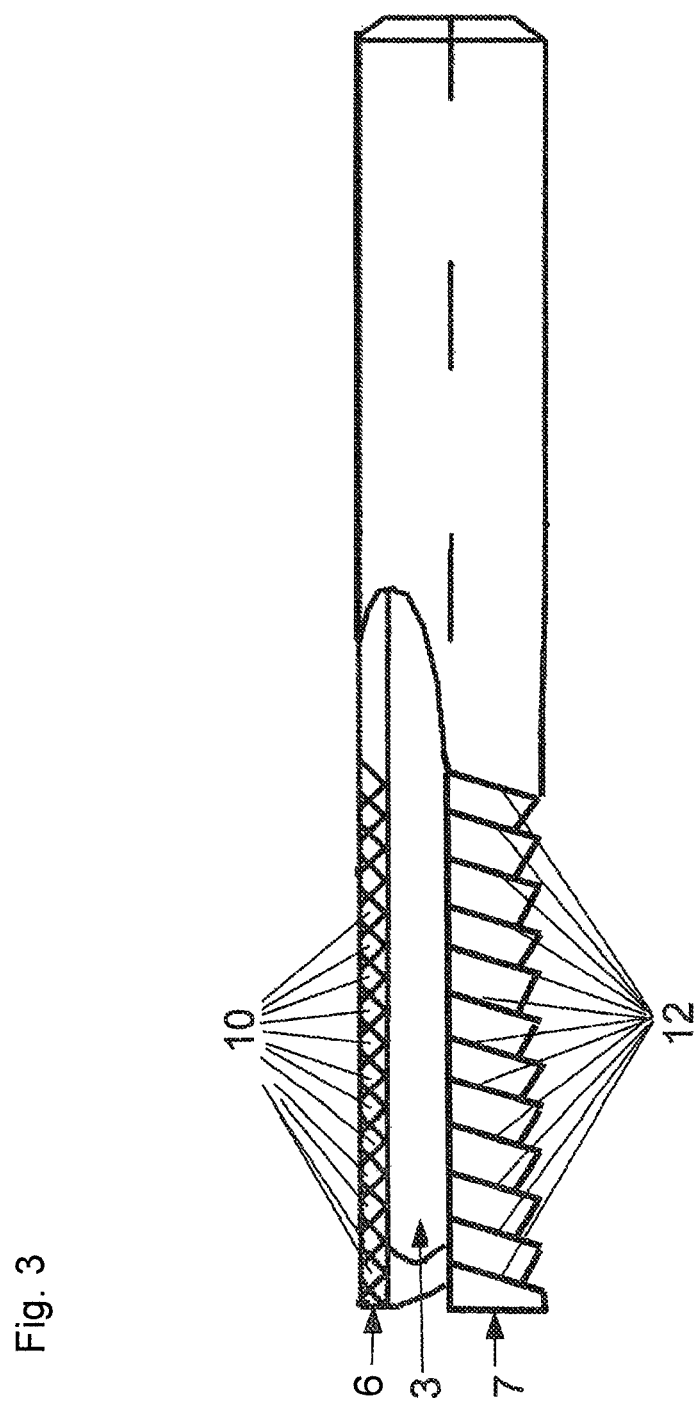
FIG. 3 is a schematic side view of the end milling cutter illustrating the other one post machining land.

Therein, the flutes 1, 2, 3, 4 extend in a straight line, that is without twist, whereas the shell grooves and hence the cutting edges 11, 12 are coiled in parallel with a slope in the shape of a helix segment around the tool axis, as can be seen from FIG. 2. The helix or twist angle γ of the shell grooves with the cutting edges 11 on the postmachining land 5 is positive and amounts in the shown example approx. 75°. The shell grooves with the cutting edges 12 at the other postmachining land 7 are formed correspondingly in parallel side by side of each other, with a shape of a helix segment, but have an opposite, ie negative helix angle, in the example in terms of absolute value also 75°. Thus, the postmachining lands 5, 7 are different in the slope of their shell grooves being ground-in peripherally in and thus are different in the slope of the respective cutting edges 11, 12, so that the postmachining land 5 is referred to as first postmachining land 5 and the postmachining land 7 as a second postmachining land 7.

Variations and modifications of the embodiments shown are possible without departing from the scope of the invention.

For example, the teeth 10 are about half as high as the shell grooves are deep in the shown example. However, it has been proven best, if the height of the teeth is about the depth of the shell grooves. In any case, the tooth height should be in the magnitude of the shell groove depth.

The invention claimed is:

1. A machining tool for machining of fiber-reinforced materials, with a plurality of flutes (1, 2, 3, 4), spacing lands (5, 6, 7, 8) placed around a cylinder core segment (9) in the circumferential direction from each other, wherein
   at least one of the lands (6, 8) is formed as a premachining land (6, 8) and at least one other of the lands (5, 7) as a postmachining land (5, 7), which lands (5, 6, 7, 8) respectively comprise a peripheral machining area extending along the tool axis of the machining tool or, shaped as a helix segment, with a twist about the tool axis of the machining tool, wherein
   the machining area of each premachining land (6, 8) is formed as peripheral file with a plurality of teeth (10), which are incorporated into a shell surface of the machining area, which shell surface is shaped as a segment of a cylindrical surface, and wherein
   in the machining area of every postmachining land (5, 7), a number of sharp cutting edges (11, 12, 13, 15) is provided shaped as a helix segment, with a twist about the tool axis,
   characterized in that
   each at a peripheral shell groove, wherein the shell grooves are incorporated into a shell surface of the machining area, which shell surface is shaped as a segment of a cylindrical surface, and which shell grooves are in parallel to each other and with slope to the flute (1, 3), which leads the at least one postmachining land (5, 7).

2. Machining tool according to claim 1, characterized in that at least one first postmachining land (5) is provided, which has a first plurality of cutting edges (11) with a positive slope, each provided at a shell groove, and at least one second postmachining land 7 is provided, which has a second plurality of cutting edges (12) with a negative slope, each provided at a shell groove, wherein each of the first plurality of cutting edges (11) and the second plurality of cutting edges (12) in particular has a helix angle (γ) of—in terms of absolute value—at least 30°, and wherein the shell grooves on the at least one first postmachining land (5) and on the second postmachining land (5) are dimensioned the same.

3. Machining tool according to claim 2, characterized in that an even-numbered plurality, in particular four flutes (1, 2, 3, 4) and thus an even-numbered plurality, in particular four lands (5, 6, 7, 8) are provided, wherein in the circumferential direction alternately a postmachining land (5, 7) trails a premachining land (6, 8) and vice versa, and wherein an equal number of first and second postmachining lands (5) are provided, in particular a single first postmachining land (5) and a single second postmachining land (5) in an alternating sequence with an interposed premachining land (6, 8).

4. Machining tool according to claim 1, characterized in that the number of sharp cutting edges (11, 12, 13, 15) comprises on each postmachining land (5, 7) a cutting edge (13, 15), which extends along an acute cutting wedge between the flute (1, 3) leading the postmachining land (5, 7) and the circumference of the postmachining land (5, 7) and which is preferably broken by the plurality of shell grooves provided there.

5. Machining tool according to claim 4, characterized in that along each premachining land (6, 8), an acute cutting wedge extends between the flute (2, 4) leading the premachining land (6, 8) and the circumference of the premachining land (6, 8).

6. Machining tool according to claim 1, characterized in that the flutes (1, 2, 3, 4) and thereby the lands (5, 6, 7, 8) extends in parallel to the tool axis.

7. Machining tool according to claim 6, characterized in that the lands (5, 6, 7, 8) are equidistantly distributed over the circumference of the tool.

8. Machining tool according to claim 7, characterized in that the teeth (10) each have a polygonal, lozenged base surface and each have a pyramid shape and are disposed along lines intersecting with positive and negative slope on the shell surface, with the height of the teeth (10) of each premachining land (6, 8) corresponds in magnitude to the depth of the shell grooves of each postmachining land (5, 7), in particular 0.5-1.5 times the depth of the shell grooves and equals the depth of the shell grooves.

9. Machining tool according to claim 8, characterized in that the machining area of each premachining land (6, 8) extends over its entire peripheral portion between the respective leading flute (2, 4) and the respective trailing flute (1, 3), wherein machining area of each postmachining land (5, 7) extends over its entire peripheral portion between the respective leading flute (1, 3) and the respective trailing flute (4, 2).

10. Machining tool according to claim 8, characterized in that the machining tool is formed as a milling tool, in particular as an end milling cutter and has a tip geometry suitable for driving into solid material.

\* \* \* \* \*